United States Patent Office 3,277,198
Patented Oct. 4, 1966

3,277,198
ALKENYLACETYLENE TRIMERIZATION
Roy T. Holm, Orinda, Lawrence G. Cannell, Lafayette, and William De Acetis, Berkeley, Calif., assignors to Shell Oil Company, New York, N.Y., a corporation of Delaware
No Drawing. Filed July 30, 1963, Ser. No. 298,545
4 Claims. (Cl. 260—673)

This invention relates to certain novel trialkenyl benzenes and their production.

The trimerization of alkyl acetylenes to form the corresponding alkyl-substituted benzenes is known to the art. Attempts to polymerize acetylenic compounds containing unsaturated hydrocarbon radicals have been limited by the fact that the polymerization is not confined to the acetylenic triple bond. Furthermore, in isolated cases when trimerization has been partially successful with an unsaturated hydrocarbon radical attached to the acetylenic compound, isomerization has occurred resulting in a shift of the ethylenic group to the carbon adjacent to the benzene ring formed. Attempts to position the ethylenic group at some distance from the benzene ring have not been successful.

It is, therefore, a principal object of this invention to provide a novel class of 1,2,4 and 1,3,5-trialkenylbenzenes wherein the ethylenic group is separated from the benzene ring by at least one carbon atom.

It is a further object of this invention to provide a novel method of preparing 1,2,4 and 1,3,5-trialkenylbenzene compounds, wherein the ethylenic group is separated from the benzene ring by at least one carbon atom.

Other objects of the invention will be apparent and the objects better understood from the description of the invention as given hereinafter.

It has now been found that a novel class of trialkenylbenzene compounds, e.g., 1,2,4 and 1,3,5-trialkenylbenzenes of from 15 to 30 carbon atoms, wherein the ethylenic group is separated from the benzene ring by at least one carbon atom, are obtained by trimerizing a non-conjugated allylic acetylenic hydrocarbon of the formula

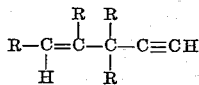

wherein the R's are independently selected from hydrogen and aliphatic hydrocarbon of from 1 to 5 carbons with a total of up to 5 R-carbons. The resulting trialkenyl benzenes are very effective intermediates in the formation of desirable thermosetting epoxy compositions.

It has been found that the trimerization can be carried out most advantageously in the presence of a catalyst complex of a transition metal, in a reduced valence state with a biphyllic ligand. The preferred oxidation state is 0.

Among the transition metals of Group VIII, the transition metals of the fourth period, i.e., those of atomic number from 26 to 28, namely, iron, cobalt, and nickel are preferred, with nickel being the most advantageous.

The term "complex" is used throughout the specification and claims and means a coordination compound formed by the union of one or more electronically rich molecules or atoms capable of independent existence with one or more electronically poor molecules or atoms, each of which is also capable of independent existence.

By "biphyllic ligand" is meant a compound having an atom with a pair of electrons capable of forming a coordinant bond with a metal atom and simultaneously having the ability to accept the electron from the metal, thereby providing additional stability to the resulting complex.

The biphyllic ligands useful in the present process include those compounds having a trivalent phosphorus atom. The preferred biphyllic ligands contain trivalent phosphorus in which the phosphorus atom has one available or unshared pair of electrons. Any compound containing trivalent phosphorus with the foregoing electronic configuration is a suitable biphyllic ligand for the catalyst of the present process. When trivalent phosphorus has such an electronic configuration, it is capable of forming a co-ordinate bond with the transition metals previously described, and simultaneously has the ability to accept electrons from these metals.

The three valences of the phosphorus atom may accordingly be satisfied by organic radicals since it is only the presence of the phosphorus atom having an available pair of electrons that is crucial to the formation of this complex with a transition metal. Consequently, organic radicals of any size and composition may be bonded to the phosphorus atom. Contemplated within the scope of this invention, therefore, are trivalent phosphorus compounds having aliphatic, cycloaliphatic, heterocyclic, and/or aromatic radicals satisfying its three valences. These radicals may contain any functional group such as the carbonyl, carboxyl, cyano, hydroxyl functional groups, saturated or unsaturated carbon-to-carbon linkages as well as saturated or unsaturated non carbon-to-carbon linkages.

The preferred phosphorus compounds of particular interest as ligands in the present process include oxygen-containing esters of trivalent phosphorus such as phosphites. Furthermore, tris(dialkylamino) phosphines wherein the alkyl contains from 1 to 8 carbons, e.g., propyl, are also suitable. In addition, the hydrocarbon radicals of the ester portion may be joined directly to the phosphorus atom thereby forming compounds which may be termed phosphines.

Trialkyl phosphites of up to 30 carbon atoms are suitable biphyllic ligands for the purposes of the process of this invention, especially where the alkyl is branched and contains from 3 to 8 carbon atoms, e.g., triisopropylphosphite and tri(2-ethylhexyl)phosphite.

The organic complex catalysts utilized in this invention may be prepared by reducing a transition metal salt of i.e., iron, cobalt or nickel in aqueous alkaline solution with an alkali metal dithionite, and intermixing a biphyllic ligand, i.e., triisopropyl phosphite, at sufficient temperature and pressure for appreciable product formation. Such a process is exemplified in U.S. patent application Serial No. 44,556, filed July 22, 1960.

The most suitable catalyst materials are the tetrakis (trihydrocarbyl phosphite)nickel(O) compounds, the most preferable of which is the tetrakis(tri-alkyl phosphite)nickel(O), e.g., tetrakis(tri-isopropyl phosphite) nickel(O).

Preferred acetylenic compounds which may be trimerized by the process of this invention are alkenyl acetylene compounds wherein the alkenyl radical contains from 3 to 8 carbon atoms, most preferably from 3 to 5 carbon atoms, and the ethylenic and acetylenic unsaturated linkages are non-conjugated. Particularly useful compounds are allylacetylene and hydrocarbylallylacetylenes in which the hydrocarbyls are substituted on the allyl group, e.g., 3-methyl-4-pentene-1-yne, 3-ethyl-4-pentene-1-yne, 4-methyl-4-pentene-1-yne, 5-ethyl-4-pentene-1-yne, 3,4-dimethyl-4-pentene-1-yne, 3-methyl-4-ethyl-4-pentene-1-yne, 3-ethyl-4-methyl-4-pentene-1-yne, 5-phenyl-4-pentene-1-yne, 3-phenyl-3-methyl-4-pentene-1-yne and 3-propyl-3-pentene-1-yne.

Illustrative trialkenylbenzenes produced by the invention are: 1,2,4 and 1,3,5-triallylbenzene from allylacetylene; 1,2,4 and 1,3,5-tribut-2-enylbenzene from 5-methyl-4-pentene-1-yne; 1,2,4 and 1,3,5-tripent-2-enylbenzene from 5-ethyl-4-pentene-1-yne; 1,2,4 and 1,3,5-trihex-2-enylbenzene from 5-propyl-4-pentene-1-yne; 1,2,4 and 1,3,5-trihept-2-enylbenzene from 5-butyl-4-pentene-1-yne;

1,2,4 and 1,3,5-tri(2-methylbut-2-enyl)benzene from 4,5-dimethyl-4-pentene-1-yne.

The trimerization reaction of the alkenyl acetylene may be advantageously performed in a closed container under pressure from an inert gas, such as nitrogen. The reaction must be performed in the absence of oxygen as the catalyst is quickly oxidized, thereby rendering it unreactive. The closed container is also necessary to retain the voltatile alkenyl acetylene at the temperature required for completion of the reaction. The pressure can be varied over a wide range, generally within the range of 5 p.s.i.g. to 1000 p.s.i.g., with 80 p.s.i.g. to 500 p.s.i.g. being preferred. The pressures of course will vary with the temperature at which the reaction is performed.

It is advantageous to carry out the process in the presence of a solvent, such as a hydrocarbon, especially a saturated aliphatic hydrocarbon such as cyclohexane or isopentane. However, the solvent is not indispensable to the reaction as the trimerization can be carried out in the absence of such a solvent.

The reaction period is not critical as long as the minimum period of time necessary for the trimerization is employed. Thirty minutes to 4 hours is suitable while about 1 to 2 hours is preferred.

The temperature employed may vary considerably over a broad range depending upon the type of reactants involved, it being generally desirable to maintain the temperature in the range of 80° C. to 150° C. with the preferred range being from 100° C. to 130° C.

The catalyst, preferably a reduced valence state nickel complex with a biphyllic organic ligand of a Group V element, e.g., phosphorus in the trivalent state such as nickel organo-phosphite complexes, e.g., a tetrakis(trihydrocarbyl phosphite)nickel(O), is added to the reaction mixture in catalytic amounts, i.e., in an amount which may vary from, e.g., 0.001% to 10.0% by weight of the alkenyl acetylene, with 0.1% to 1% being the most preferred.

Epoxidation of unsaturated radicals of the trialkylbenzenes may be carried out by reacting the trialkylbenzenes with epoxidizing agents usually used for epoxidizing olefinically unsaturated hydrocarbons. Suitable epoxidizing agents, in addition to peracetic acid include other organic peracids such as perbenzoic acid, monoperphthalic acid and the like.

The triepoxyalkylbenzene compounds can be employed advantageously, independently, or in combination as a reactive diluent with various other polyepoxides. The polyepoxides may be saturated or unsaturated, aliphatic, cycloaliphatic, aromatic or heterocyclic and may be substituted if desired with substituents, such as chlorine atoms, hydroxyl group, ether radicals and the like. They may also be monomeric or polymeric.

In addition to being useful reactive diluents for epoxy resins, the triepoxyalkylbenzenes produced herein are especially useful in other applications. They may be condensed with alkylene oxides and glycols to provide polyalkylene oxyglycols and the like containing benzene groups in the polymer chain which modify the properties of the product. The epoxy groups can be hydrolyzed to alcohol groups. For example, 1,3,5-triglycidylbenzene is hydrolyzed to 1,3,5-tri(2,3-dihydroxypropyl)benzene which, in turn, is useful as a hydrocarbon distillate anti-icant and useful for the synthesis of polyester and polyurethane plastics and resins.

Exemplary triepoxyalkylbenzenes are 1,2,4 and 1,3,5-tri(glycidyl)benzene, 1,2,4 and 1,3,5-tri(2,3-epoxybutyl)benzene, 1,2,4 and 1,3,5-tri(2,3-epoxypentyl)benzene, 1,2,4 and 1,3,5-tri(2,3-epoxyhexyl)benzene, 1,2,4 and 1,3,5-tri(2,3-epoxyheptyl)benzene, and 1,2,4 and 1,3,5-tri(2,3-epoxyoctyl)benzene.

The following specific examples will serve to illustrate more clearly the application of the invention, but they are not to be construed as in any manner limiting it.

The volume and weight relations are the same as the relation of liter to kilogram.

Example I

In a glass bomb flushed with dry $N_2$ and sealed by a Teflon washer and stainless steel cap including a gauge and valve was placed one volume of allyl acetylene, 2 volumes of isopentane and 0.50 volume of catalyst solution (1.0 part by weight of a compound of the empirical formula, $Ni[P(O-iC_3H_7)_3]_4$ in 20 volumes of isopentane). The bomb was sealed and heated in an oil bath to 100° C. The pressure was 35 p.s.i.g. The material was heated for an hour whereupon the temperature rose to 120° C. and the pressure to 68 p.s.i.g. Continued heating for another hour at 130° C. caused the pressure to rise to 70 p.s.i.g. The bomb was removed from the oil bath and allowed to cool overnight. The pressure was 6 p.s.i.g. at room temperature. Gas-liquid chromatography (GLC) showed triallybenzene in about a 30% yield.

Example II

Utilizing the method of Example I, 1 volume of allyl acetylene, 2 volumes of cyclohexane and 0.0375 part by weight of $Ni[P(O-iC_3H_7)_3]_4$ were heated together at 120° C. for an hour. During this period the pressure, after an initial rise to 29 p.s.i.g., fell to 23 p.s.i.g. Heating was continued for another hour at 130° C., during which time the pressure was 24 p.s.i.g. GLC analysis showed triallylbenzene in about 25–30% yield.

Example III 18.5 parts by weight (25 volumes) of allyl acetylene, 50 volumes of cyclohexane, and 1.0 part by weight of $Ni[P(O-iC_3H_7)_3]_4$ were sealed in a 150 volume stainless steel bomb under dry $N_2$. The bomb was placed in an 80° C. oil bath and the bath heated to 95° C. The pressure increased from 5 p.s.i.g. to 35 p.s.i.g. Although the temperature was held constant, the pressure fluctuated up to 65 p.s.i.g., indicating that a reaction was occurring. The pressure then fell to 20 p.s.i.g whereupon heating was resumed to 130° C., the pressure increasing slowly to 30 p.s.i.g. The heat was removed and the bomb allowed to cool overnight in the oil bath. The brown product still under pressure was transferred to a flask and distilled through a spinning band column. The charge to the still, which included a small amount of cyclohexane used to wash out the bomb, was 65 parts by weight and was recovered as follows:

| Cut | Temp. (pressure) | Weight (parts) |
| --- | --- | --- |
| 1 | 40–78° C. (760 mm.) | 26 |
| 2 | 78–79° C. (760 mm.) | 16 |
| 3 | 47–108° C. (6 mm.) | 1 |
| 4 | 108–115° C. (6 mm.) | 8 |
| 5 | Stripped over by reducing pressure (<1 mm.). | 3 |
| Residue | Very viscous and dark brown | 6 |

The infrared spectrum of Cut No. 4 indicated a trisubstituted benzene having mono-substituted ethylenic groups. The UV spectrum in ethanol indicated that none of the side chain double bonds was conjugated with the ring. Gas liquid chromatography indicated 2 isomers in nearly equal amounts. Cut No. 5 is similar to Cut No. 4.

Example IV (a) A feed solution of 50 volumes (39 parts by weight) of allyl acetylene in 100 volumes of dry cyclohexane and 2.0 parts by weight of $Ni[P(O-iC_3H_7)_3]_4$ was placed in a flushed cylinder under 80 p.s.i.g. pressure of nitrogen. This cylinder was connected by feed lines to a coil submerged in an oil bath. A cylinder of cyclohexane solvent was connected in the system. The oil bath was maintained at 120° C. and the feed introduced into the coils over a half-hour period. The feed remained in the reaction zone for an hour during which time the pressure rose from 80 to 95 p.s.i.g. The system was flushed with cyclohexane. The darkened, brown product weighed 276 parts by weight. By GLC it was found that there had been about a 50% conversion of the allylacetylene to triallylbenzene.

(b) Repeating (a) with an oil bath temperature of 100° C. resulted in a conversion of about 65%.

(c) Repeating (b) with the use of 1.0 part by weight of catalyst resulted in a conversion of about 44%.

(d) Repeating (c) with a reduced feed rate increasing the residence time to 93 minutes resulted in a conversion of about 44%.

(e) Repeating (b) with an accelerated feed rate so that the residence time was 45 minutes resulted in a conversion of about 68%.

The products from a to e were combined and washed thrice with 5% $H_2O_2$ solution, water and 5% sodium bisulfite, dried, filtered and distilled. After most of the cyclohexane had been overheaded using a 20 tray Oldershaw column, the residue was distilled through a spinning band column with the following results:

| Cut No. | Temp (pressure) | Weight (parts) |
| --- | --- | --- |
| 1 | 80° C. (760 mm.) | |
| 2 | 50–86° C. (6 mm.) | 8 |
| 3 | 86–105° C. (6 mm.) | 3 |
| 4 | 105–113° C. (6 mm.) | 130 |
| 5 | 100° C. (1 mm.) | 11 |
| Residue | | 48 |

Cut No. 4 was anaylzed.

*Analysis.*—Calculated for $C_{15}H_{18}$: C, 90.8%; H, 9.15%. Found: C, 90.5%; H, 9.1%.

Example V 20 grams (0.1 mole) of triallyl benzene, 66.2 grams (0.33 mole) of 37.9% peracetic acid in combination with 3.5 cc. of 20% by weight sodium acetate and 200 milliliters of methylene chloride were combined and stirred in a 500 milliliter Morton flask for 21 hours. The resulting product was washed with water and 5% $KHCO_3$, dried, filtered and stripped in a steam bath under vacuum. The residue consisted of 21 grams of slightly cloudy liquid which contained 1.0 equivalent of epoxide/100 gram of material. Theory for triglycidylbenzene is 1.22 eq./100 grams.

A 1.0 gram sample of the epoxide was mixed with 0.27 gram of m-phenylenediamine and stored overnight. The gelled casting was then cured for 2 hours at 150° C. The resulting brittle brown casting had a Barcol hardness af 55.

Example VI 50 grams (0.25 mole) of triallylbenzene was combined with 167 grams (0.83 mole) of 37.9% peracetic acid, 9 cubic centimeters of 20% by weight sodium acetate solution and 500 cubic centimeters of chloroform and the mixture stirred at 50° C. for six hours. The resulting product was washed with water and 5% $KHCO_3$ solution, dried over $MgSO_4$, filtered and stripped of chloroform on a steam bath under vacuum.

Two such experiments were combined and the product molecularly distilled at 150–160° C. (0.001 mm.). The distillate weighed 78 grams and had an epoxide value of 1.16 equivalents/100 grams and a viscosity of 120 cps. at 22° C.

We claim as our invention:

1. The process of preparing triallylbenzene by trimerizing allyl acetylene in an inert reaction environment at a temperature of from 80° C. to 150° C. and a pressure of from 5 p.s.i.g. to 1000 p.s.i.g., in the presence of, as catalyst, from 0.001% wt. to 10% wt. based on the allyl acetylene of tetrakis(trihydrocarbyl phosphite)nickel(O) wherein each trihydrocarbyl phosphite is trihydrocarbyl phosphite of up to 30 carbon atoms.

2. The process of claim 1 wherein each hydrocarbyl of said trihydrocarbyl phosphite is branched alkyl of from 3 to 8 carbon atoms.

3. The process of preparing triallylbenzene by trimerizing allyl acetylene in an inert reaction environment at a temperature of from 100° C. to 130° C. and a pressure from 5 p.s.i.g to 1000 p.s.i.g. in the presence of, as catalyst, from 0.1% wt. to 1% wt. based on the allyl acetylene of tetrakis(trihydrocarbyl phosphite)nickel(O) wherein each hydrocarbyl is branched alkyl of from 3 to 8 carbon atoms.

4. The process of claim 3 wherein said tetrakis(trihydrocarbyl phosphite)nickel(O) is tetrakis[tri(isopropyl)phosphite]nickel(O).

References Cited by the Examiner
UNITED STATES PATENTS 3,117,952  1/1964  Meriwether _____ 260—673
3,131,155  9/1964  Lutting _____ 260—673

ALPHONSO D. SULLIVAN, *Primary Examiner.*